Jan. 5, 1960  J. C. NORD  2,919,872
AIRCRAFT ARRESTER
Filed Feb. 11, 1957  4 Sheets-Sheet 1

INVENTOR.
JOHN C. NORD
BY Robertson and Yautie
ATTORNEYS.

Jan. 5, 1960 J. C. NORD 2,919,872
AIRCRAFT ARRESTER
Filed Feb. 11, 1957 4 Sheets-Sheet 3

INVENTOR.
JOHN C. NORD
BY Robertson and Yonte
ATTORNEYS

United States Patent Office 2,919,872
Patented Jan. 5, 1960

2,919,872

AIRCRAFT ARRESTER

John C. Nord, Holmes, Pa.

Application February 11, 1957, Serial No. 639,284

10 Claims. (Cl. 244—110)

This invention relates generally to devices for arresting the motion of vehicles, and is particularly concerned with such arresting devices as are adapted for use with aircraft during landing.

As is well known to those versed in the art, prior aircraft arresting devices have been subject to certain serious shortcomings such as their lack of versatility which required that the arresting device be changed or modified for use with different types of aircraft, as well as when used in conjunction with different kinds of landing strips, or at different locations thereon. Further, aircraft arresting devices heretofore employed were not sufficiently reliable in operation, often relying largely upon the skill of the pilot for their effective use, and often causing damage, even to those aircraft properly piloted.

It is therefore one object of the present invention to provide an aircraft arresting device which overcomes the above mentioned difficulties, and which is substantially entirely automatic in operation, being actuated in response to the presence of an aircraft to be arrested, and wherein the subject device independently and automatically effects arresting engagement with a landing aircraft without reliance upon the pilot thereof.

It is another object of the present invention to provide an aircraft arresting device of the type described which is automatically responsive to a wide variety of aircraft for arresting the same, regardless of shape or height of the aircraft, or type of landing gear employed on the aircraft. The arresting device of the instant invention is extremely well adapted for use on all types of landing runways, at any desired location thereof, including seagoing carriers, and is equally effective under all weather conditions.

It is a specific object of the present invention to provide an aircraft arresting system which includes a novel arresting line receiver adapted to be carried by an aircraft, wherein the arresting line is automatically held when received, and adapted to be ejected from a remote location, as by the aircraft pilot, when desired.

An additional specific object of this invention resides in the provision of arresting line carriers movable vertically for engaging the line with an incoming aircraft and adapted to quickly and surely release the arresting line under the force of engagement by an incoming aircraft without excessive force imparted to the line carriers.

It is a further object of the present invention to provide an aircraft arresting device having the advantageous characteristics mentioned in the foregoing paragraphs, which is extremely simple in construction, positive, efficient and reliable in operation, and which can be manufactured, installed and maintained at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
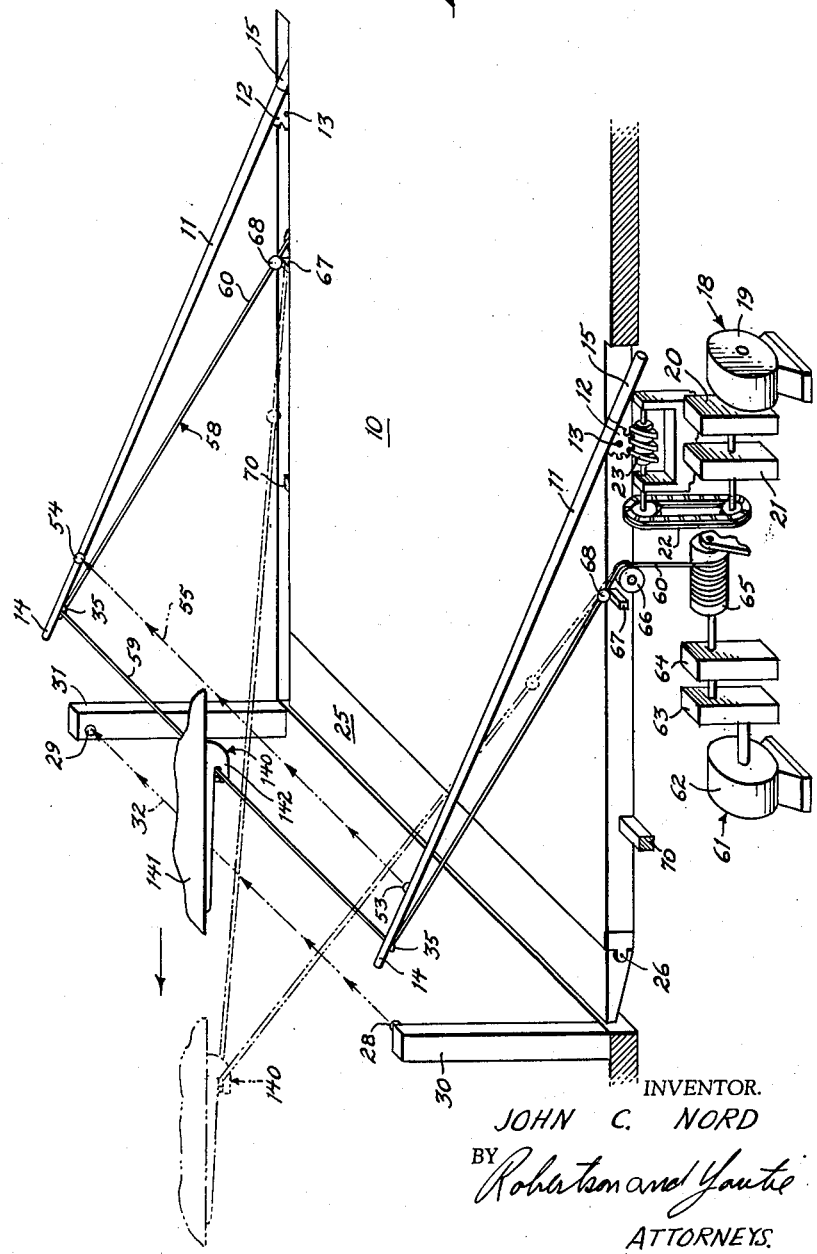
Figure 1 is a top perspective view showing an aircraft arresting device of the present invention in operative condition, and illustrating a part of an incoming aircraft being arrested.
Figure 2:
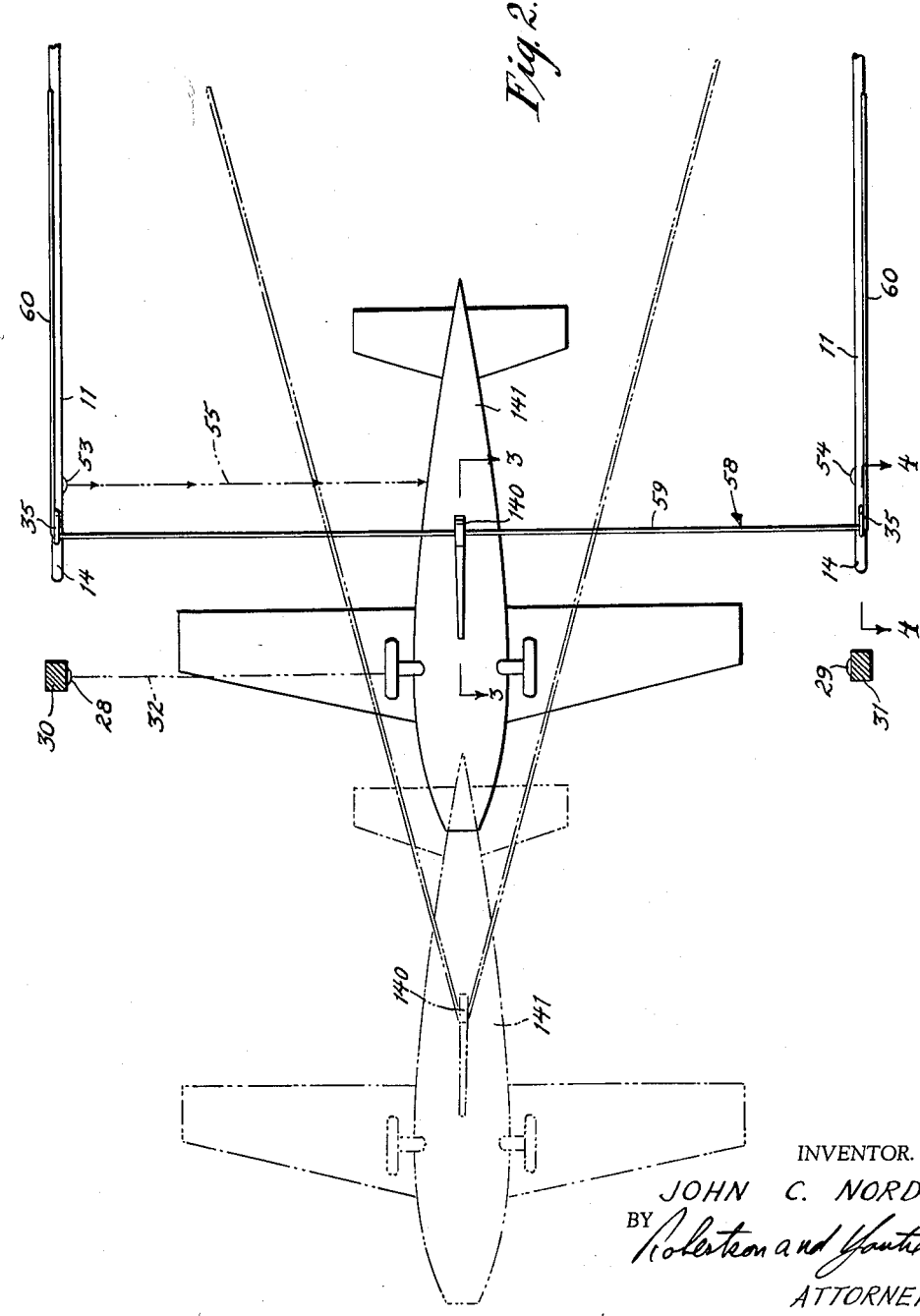
Figure 2 is a bottom plan view showing the apparatus of Figure 1 and the arresting condition illustrated in phantom.

Referring now more particularly to the drawings, and specifically to Figures 1 and 2 thereof, there is illustrated therein a landing runway, generally designated 10, for aircraft, which may be any desired runway, including that of a seagoing aircraft carrier. A pair of elongate outriggers or arms 11 are arranged in parallelism and on opposite sides of the runway 10 extending generally longitudinally over the latter. Adjacent to and spaced from the forward ends of the outriggers 11 (the rightward end as seen in Figures 1 and 2) are provided ears 12 which receive generally horizontal, aligned pivots 13 mounting the outriggers on the runway for swinging movement about the axis of the pivots. More specifically, the ears or lugs 12 and pivots 13 mount the outriggers 11 for swinging movement of their rearward ends 14 upward and downward between a lower position nested in the runway and an upper, illustrated position. The forward outrigger ends 15 are advantageously counterbalanced or weighted to approximately counterbalance the major arm portion rearward of the pivot 13.

Each of the pivot lugs 12 is preferably provided with teeth to define a worm wheel; and, suitable operating means, as at 18, may be associated with each outrigger 11 in driving connection with the tooth ears 12 for effecting up and down swinging movement of the outriggers. As each of the outrigger operating or drive means 18 may be identical, a description of the single illustrated drive means will suffice. The drive means 18 may include an electric motor 19 having its shaft connected through a gear train, diagrammatically illustrated at 20, to a clutch 21. The clutch is in turn connected in driving relation by a chain 22 to a rotatable worm 23 in meshing engagement with the respective tooth lug 12. Thus, rotation of the worm 23 in opposite direction, as effected by operation of the motor 19, will effect up and down swinging movement of its outrigger 11. The drive means 18 of both outriggers 11 are synchronized to effect up and down swinging movement of the outriggers in substantial parallelism with each other.

Means for sensing the presence of an aircraft landing on the runway 10 to be arrested, is provided in the form of a resiliently yieldable depressible member or treadle 25 which may be pivotally mounted in the runway 10, as by pivot means 26, to be depressed by engagement with the wheels of an incoming aircraft. The treadle 25 preferably extends transversely across the runway, and is provided with suitable switch means, as will appear presently, operatively connected to the outrigger drive means 18 to effect upward swinging movement of the latter in response to depression of the treadle. Thus, the treadle is located longitudinally over the runway in a position such that treadle depression and consequent outrigger swinging movements are properly timed relative to the motion of an incoming aircraft. Additional means for sensing the presence of an aircraft to be arrested is provided in the form of a lamp or illuminating source 28 and photoelectric cell 29 respectively mounted on supports 30 and 31 located on opposite sides of the runway 10 to define a beam 32 extending across the runway. The beam is thus located in position to be broken by the presence of an incoming aircraft to be arrested; and, the photo cell 29 is operatively connected, as will appear hereinafter in greater detail, to the outrigger drive means for effecting upward swinging movement of the outriggers in response to the breaking of the beam. Of course, the supports 30 and 31, and consequently the beam 32, are located longitudinally of the runway 10 so as to effect upward swinging movement of the outriggers 11 in properly timed relation with respect to an incoming aircraft.

Figure 4:
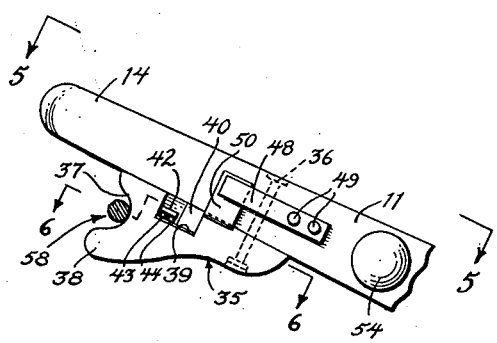
Figure 4 is a partial sectional elevational view taken substantially along the line 4—4 of Figure 2.
Figure 5:
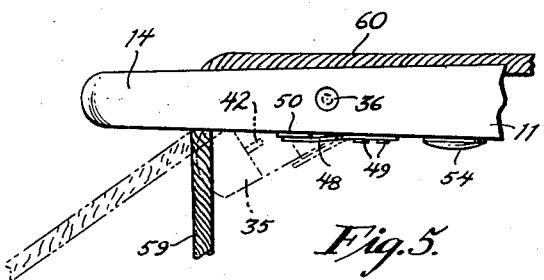
Figure 5 is a plan view taken substantially along the line 5—5 of Figure 4.
Figure 6:
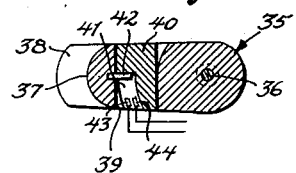
Figure 6 is a sectional view taken substantially along the line 6—6 of Figure 4.

Adjacent to the rearward ends of the arms or outriggers 11, on the other side thereof, are provided line carriers 35, which are substantially identical to each other, one being illustrated in detail in Figures 4–6. It will there be seen that each carrier 35 is of elongate configuration, arranged longitudinally and on the under side of its respective outrigger arm 11 adjacent to the rearward end thereof 14. Each arresting line carrier 35 has its forward end portion pivotally connected to the respective outrigger 11, as by a pin 36 disposed in a generally vertical plane. The rearward portion of each line carrier 35 is formed with a rearwardly facing, laterally opening concavity or cutout 37, which serves to form a lower, rearwardly extending protuberance 38, best seen in Figure 4. Thus, with the line carrier 35 disposed longitudinally of its outrigger 11, the extension 38 and adjacent concavity 37 combine to define a rearwardly opening hook.

The upper side of each line carrier 35 is recessed or cut out at 39 to open upward toward its outrigger 11; and, a lug or boss 40 depends from the respective outrigger into its adjacent carrier recess 39. Each outrigger boss 40 is formed with an arcuate laterally inwardly opening slot or groove 41 which receives a contact pin or leaf 42 carried by the adjacent line carrier 35. That is, the contact pin or leaf 42 projects rigidly from its carrier 35 into the recess thereof 39, being received in the adjacent lug groove 41, and engages with the end wall of the latter groove to limit outward swinging movement of the carrier to a position longitudinally of the outrigger arm. In the bottom wall of the groove 41 are provided contacts 43 and 44 adapted to be engaged by the contact pin 42 upon inward swinging movement of the latter with its carrier 35. In Figures 4 and 5 it will be observed that a leaf spring 48 is arranged longitudinally on the inner side of each outrigger arm 11 and secured at its forward end to the arm by fasteners 49. A plate 50 is carried on the rearward end of each leaf spring 48 and extends into engagement with the inner side of the adjacent carrier 35, so as to yieldably and resiliently resist inward swinging movement of the carrier and bias the latter toward its limiting position of swinging movement in longitudinally alignment with the respective outrigger arm. The contacts 43 and 44 are connected in the electrical system of the apparatus, as will appear hereinafter in greater detail.

Also carried on the outrigger arms 11, respectively, adjacent to their rearward ends 14 are a light source or lamp 53 and photoelectric cell 54, which combine to define a beam 55. The light source 53 and photoelectric cell 54 are operatively connected to the outrigger drive means 18 to effect cessation of upward outrigger movement, by electrical circuitry as will appear presently.

A flexible arresting line or cable, generally designated 58, has an intermediate portion 59 normally extending between the rearward end portion of the outriggers 11 and engaged in the rearwardly facing carrier hooks 37, 38. The opposite end portions 60 of the arresting cable 58 extend, respectively, from the line carriers 35 generally forward beneath the outrigger arm 11 for connection to line payout and retrieving means, generally designated 61. That is, identical line payout and retrieving means 61 may be located on opposite sides of the runway 10 associated with opposite end portion 60 of the cable 58, so that illustration and description of a single such means will suffice. Each line payout and retrieving means may include an electric motor 62 in driving connection through a clutch 63 and brake 64 with a rotary windlass or winch 65. Each line end portion 60 is coiled about its adjacent windlass 65 and extends therefrom over a guide pulley 66 and then to the adjacent carrier or hook 35. Arranged adjacent to each guide pulley 66 is a limit switch 67 which is operatively connected to the line payout and retrieving means 61, as by circuitry to be described hereinafter. An enlargement or ball 68 is carried on each end portion 60 of the cable 58, and located thereon for engagement with the adjacent limit switch 67 when the cable is in its normal operative, solid line position of Figure 1. Additional limit switches 70 are located on opposite sides of the runway 10, each directly beneath a respective outrigger arm 11 and operatively connected, as will appear presently, to the outrigger drive means 18 to halt operation of the latter. Upon downward swinging movement of the outrigger arms 11, they engage the respective switches 70 when in their fully lowered positions, and thereby effect cessation of the outrigger lowering movement.

Figure 7:
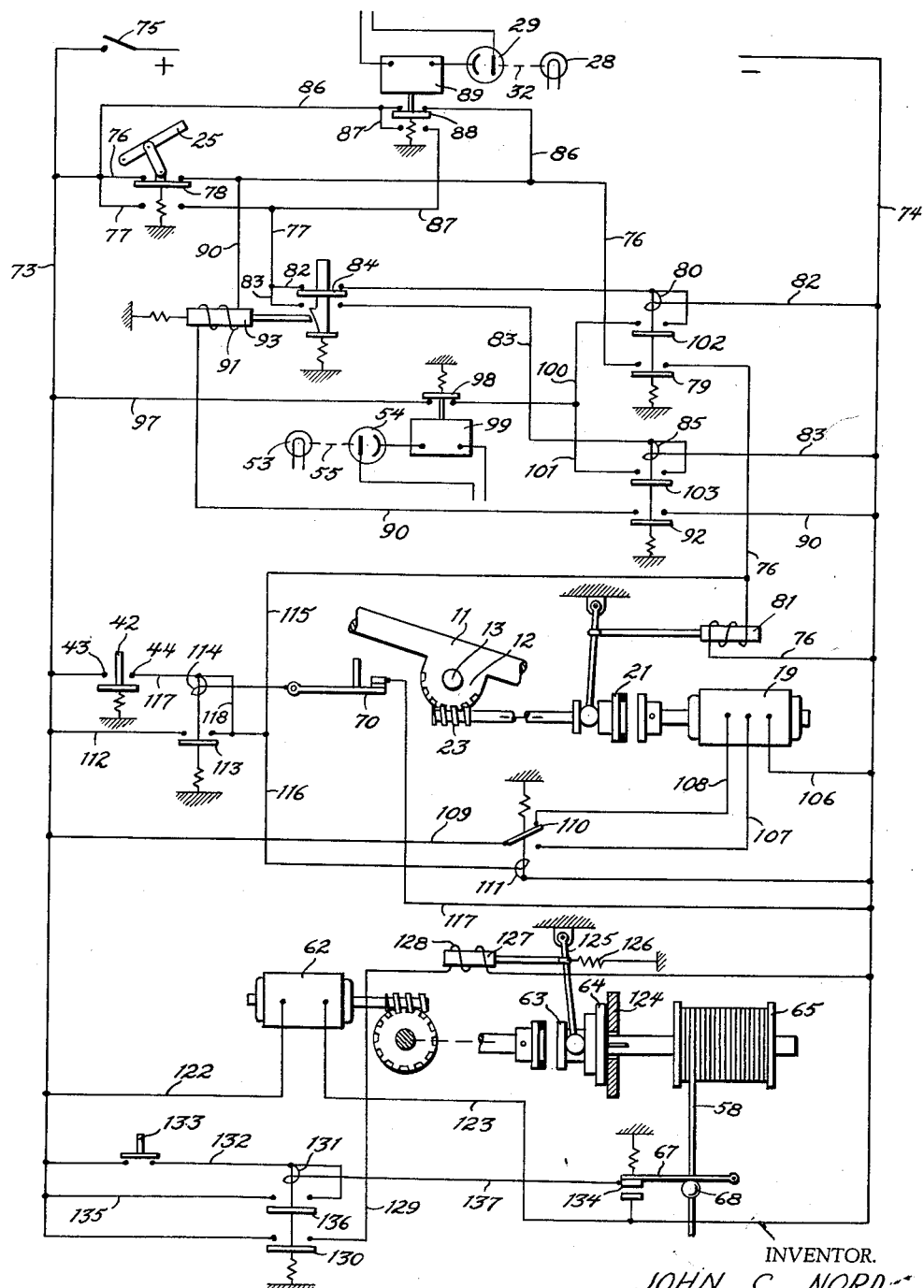
Figure 7 is a schematic representation showing the operating elements of the subject invention and their electrical circuits.

In the electrical diagram of Figure 7, power lines are designated 73 and 74, the former being provided with a master switch 75. Leading inward from the power lines 73 are a pair of branch lines 76 and 77, in which are located a selector switch 78 which is adapted to selectively close either of the branch lines and normally closes the former. The selector switch 78 is operatively connected to the treadle 25 and effective to close the branch line 77 upon the depression of the treadle. The branch line 76 continues from the selector switch 78 away from the power line 73, containing the lower normally open contact blade 79 of a relay 80, and a solenoid 81, from which the line 76 extends to the supply line 74. The branch line 77 extends from the selector switch 78, and in turn form branch lines 82 and 83 in which is located a selector switch 84 normally closing the branch line 82 and adapted to be latched in closing relation with the branch line 83, as will appear presently. The branch line 82 extends from the selector switch 84 through the coil of relay 80 and to the supply line 74, while the branch line 83 extends from the selector switch 84 through the coil of a relay 85 to the supply line 74.

In addition, branch lines 86 and 87 lead in from the supply line 73 through a relay operated selector switch 88; and, the branch 86 extends from the latter selector switch to the line 76, while the branch line 87 extends from the last mentioned selector switch to the branch line 77. The selector switch 88 normally maintains the line 86 closed, and is adapted to be actuated by a relay 89 connected in circuit with the photoelectric cell 29 to open the line 86 and close the line 87 when the beam 32 is broken.

A line 90 extends from the line 76 between the selector switch 78 and relay blade 79, and includes a solenoid coil, from which the line 90 extends to a normally open contact blade 92 of the relay 85, and thence to the supply line 74. The solenoid 91 includes a normally extended core 93 which is adapted to selectively latch the switch 84 in closing relation with respect to the line 83, and to release the latter switch to its normal position upon energization and retraction of the solenoid. Also leading in from the supply line 73 is a line 97 which contains a normally closed switch 98 adapted to be opened by the relay or control 99 in response to breaking of the light beam 55. The line 97 extends from the switch 98 to form branches 100 and 101. The former branch contains a normally open contact or switch blade 102 of the relay 80 and extends from the switch blade to the coil of the latter relay for connection through said coil and through line 82 to supply line 74. The branch line 101 includes a normally open contact blade or switch 103 and is connected through the coil of relay 85 and the line 83 to the supply line 74.

The outrigger drive motor 19 is provided with leads 106, 107 and 108, the first mentioned being connected to the power line 74, and the latter two being adapted for alternative connection to the power line 73 through a branch line 109 and a selector switch 110 of relay 111. By this means, either of the lines 107 or 108 are connected to the power line 73 for selective operation of the motor 19 in opposite directions. A line 112 which leads in from the power line 73 includes the normally open switch blade 113 of a relay 114, and extends from the switch blade to form branch lines 115 and 116. The branch line 115 is connected between the lead-in line 112 and the line 76, at a point on the latter between the switch blade 79 and coil of solenoid 81, while the branch line 116 extends from the line 112 to the power line 74 and includes the coil of relay 111. An additional lead-in line 117 is connected to the power supply line 73, and includes the contacts 43 and 44 of normally open switch 42, which was described hereinbefore in connection with the line carrier 35. From the switch 42, the line 117 extends inward, including the coil of relay 114, and the normally closed switch 70, from which the line 117 is connected to the power supply line 74. A bypass line 118 is connected from the lead-in line 112, at a point between the switch 113 and branch line 116, to the lead-in line 117, at a point between the switch 42 and relay 114.

The motor 62 of the line payout and receiving means is connected across the supply lines 73 and 74 by lines 122 and 123, respectively. The windlass brake 64 is normally held in braking engagement with the brake plate 124 by the arm 125 and resilient means 126; and, the core 127 of solenoid 128 is connected to the arm 125 to effect disengagement of the brake 64 and engagement of the clutch 63 upon energization of the solenoid. A line 129 leads in from the power supply 73 through a normally open switch 130 of a relay 131, and extends thence through the coil of solenoid 128 to the power line 74. Also extending in from the power line 73 is a line 132, which contains a normally open selectively actuable switch 133, and includes the coil of relay 131. The line 132 extends from the coil of relay 131 through a normally closed switch 134 to the power line 74. A holding line 135 extends in from the power line 73 to a point on the line 132 between the switch 133 and coil of relay 131, and includes a normally open contact blade or switch 136 of the latter relay.

Figure 3:
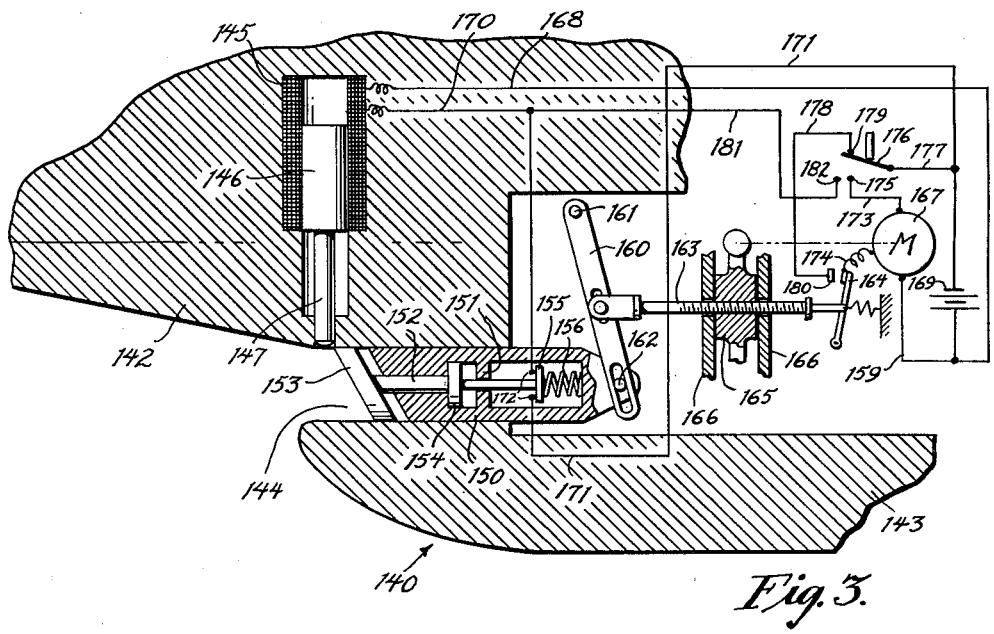
Figure 3 is a sectional elevational view on line 3—3 of Figure 2 showing an arresting line receiver of the present invention adapted to be carried by an aircraft.

In Figures 1 and 2 are illustrated a generally hook-shaped line receiver 140 carried on the underside of an aircraft 141, facing forwardly with respect to the latter, for engagement with and reception of an intermediate portion of line 58 upon the landing of the aircraft. The receiver 140 includes a generally hook-shaped body 142, the internal structure of which is best seen in Figure 3. The line receiver body 142 includes a rearward bight portion 143 and a forwardly facing, generally central opening 144.

Arranged generally vertically within the upper portion of the line receiver body 142, directly over the line receiver opening 144 is a solenoid 145 including a vertically shiftable core 146 having a depending latch member or extension 147 shiftable with the core from its illustrated retracted position out of the opening 144 to a lower position extending across and closing the opening 144. As will appear hereinafter in greater detail, the latch member 147 is normally retained in upper, open position to allow the reception of an arresting line in the receiver opening 144, and falls to its closed position to retain the arresting line in the receiver.

An ejector or plunger 150 is arranged longitudinally of the receiver 140 and mounted in the bight portion 143 of the receiver for forward and rearward shifting movement into and out of the receiver opening 144. The ejector 150 may be hollow, as illustrated, and provided with an internal wall or abutment 151. An elongate trip member or rod 152 is mounted longitudinally of and within the ejector for plunger 150 for longitudinal sliding movement relative to the latter, and is provided on its forward end, exteriorly of the ejector with an enlarged head 153 arranged in forwardly inclined relation. A shoulder 154 is formed on the shank of the trip member 152 interiorly of the ejector body 150 for engagement with the abutment 151 to limit rearward retraction of the trip member and its head 153 relative to the ejector. On the rearward end of the trip member shank 152, interiorly of the ejector 150, is provided a switch member or plate 155; and, a coil compression spring 156, or other suitable means may be arranged interiorly of the ejector to resiliently bias the trip member to its limiting position of forward movement relative to the ejector, which position is shown in Figure 3. Thus, the trip member 152 is resiliently yieldable rearward relative to the ejector 150 against the force of spring 156.

Arranged interiorly of the line receiver body 142 adjacent to the rearward end of the ejector 150 is a lever arm 160 which has one end pivoted to the receiver body, as at 161, and has its other end connected to the rearward end of the ejector by a pin-in-slot connection 162. An externally threaded operating rod 163 is pivotally connected at its opposite ends to an intermediate portion of the arm 160 and the blade of a normally open switch 164. A lead nut 165 is threadedly engaged with the operating rod 163 and held against movement with the rod longitudinally thereof by retaining members 166 in the line-receiver body. It will now be apparent that rotation of the nut 165 on the rod 163 will effect swinging movement of the arm 160 and reciprocation of the ejector 150. A motor 167 is operatively connected in driving relation by any suitable means to the lead nut 165 to effect rotation of the latter relative to the operating rod 163.

The coil of solenoid 145 is connected by line 168 to one side of an electrical source or battery 169, and is connected through lines 170 and 171 to the other side of the battery. In the line 171 are contacts 172, which are located interiorly of the ejector 150 for movement therewith and in position for engaging the switch plate 155 in the normal, forward position of the trip member 152. Thus, rearward depression of the trip member 152 serves to open the line 171.

The motor 167 is connected to one side of the battery by a line 159, and is provided with leads 173 and 174 adapted for alternative connection to the other side of the battery for effecting operation of the motor in opposite directions, as will appear presently. The motor lead 173 terminates in a contact 175; and, a manually operable switch 176 is connected through line 177 to the line 171. The switch 176, which is illustrated in its normal position away from the contact 175, is movable to engage the latter contact and thereby place the motor 167 across the battery 169 to actuate the motor in one direction of rotation. A line 178 includes terminal contacts 179 and 180, the former being normally engaged by the switchblade 176, and the latter being adapted for contact with the limit switch 164 when the ejector 150 is not in its fully retracted position. Thus, when the ejector is not fully retracted, the motor 167 is connected across the battery 169 on one side by the line 159, and on the other side by the lines 171, 177, switch 176, line 178, switch 164, and line 174.

In this condition, the motor rotates to turn the nut 165 and effect retraction of the ejector 150 until the limit switch 164 is opened by movement out of engagement with the contact 180.

An additional line 181 is connected at one end to the line 170, and terminates at its other end at a contact 182 located for engagement with the switchblade 176 when the latter is shifted into engagement with the contact 175. Thus, upon actuation of the switch 176, the solenoid 145 is energized by the battery 169, being connected to the latter on one side by line 168, and on the other side by lines 170 and 181, switch 176, and lines 177 and 171. Depression of switch 176 thereby energizes solenoid 145 to retract the latch member 147 out of the opening 144 and simultaneously actuates the motor 167 to project the ejector 150 forward in the opening.

Operation

In order to place the apparatus in operative condition, the master switch 75 is closed, which actuates the motor 19 through lines 73 and 109, switch 110, and lines 108, 106, and 74. Closure of the master switch 75 also actuates the motor 62 through lines 73 and 122, and lines 123 and 74. When a landing aircraft approaches the runway 10, its landing gear breaks the light beam 32 and depresses the treadle 25, either one of which serves to actuate upward swinging movement of the outrigger arm 11. In particular, depresssion of the treadle 25 temporarily closes switch 78 in branch line 77 which, through line 82 and switch 84, energizes the coil of relay 80 to close the switches thereof 102 and 79. The switches of relay 80 are held closed by current in the line 97, switch 98, line 100 and line 82. With the relay switches 101 and 79 thus held closed, the treadle switch 78 returns to its closing relation with the line 76, so that current passes through the latter line, its switch 79, and solenoid 81 to shift the clutch 21 into engagement with the operating motor 19 and effect upward swinging movement of the outrigger 11.

Should the treadle 25 fail to be depressed, as by skipping of the aircraft wheels, the beam 32 will definitely be broken by the aircraft landing gear to operate the control 89 which places the switchblade 88 in closing relation in the branch line 87. As the latter line is connected to the line 77, upward swinging movement of the outriggers will be effected as described hereinbefore.

If it is desired to employ the apparatus for arresting aircraft having tricycle landing gear, it is necessary that each of the sensing means, as defined by the treadle 25 and light beam 32, be twice actuated to prevent untimely upward swinging movement of the outriggers. That is, upward swinging movement of the outriggers should not be initiated in the arresting of tricycle-type aircraft until all of the landing gear has cleared the arresting line 58. This may be readily accomplished by merely depressing the switch 84 to close the line 83, in which condition the solenoid core 93 serves to latch the switch. That is, the switch 84 is held in its depressed condition by the solenoid 91. When the treadle 25 is depressed once, current passes through the lines 77 and 83, switch 84, and relay coil 85 to close the relay switches 103 and 92. The switches are held closed by current passing through the line 97, switch 98, line 101, switch 103, relay coil 85, and line 83. Upon return of the treadle switch 78 to close the line 76, current passes through the latter switch and line, and through the line 90, its solenoid 91, and switch 92. This energizes the solenoid to retract its latching core 93 and release the switch 84 to its normal position closing the line 82. A second depression of the treadle 25 then serves to effect upward swinging movement of the outriggers, as described hereinbefore. Obviously, depression of switch 84 makes it necessary to twice break the light beam 32, to effect upward swinging movement of the outriggers in the same manner as described in connection with the treadle 25.

When the outriggers 11 swing upward sufficiently so that the light beam 55 is broken by the belly of a landing aircraft, the electric control or relay 99 is actuated to open the switch 98, which causes the relays 80 and 85 to drop out and open the relay switches 102, 79, 103, and 92. The solenoid 81 is therefore no longer energized and effects disengagement of the clutch 21 from the motor 19 to halt upward swinging movement of the outriggers at a desired elevation.

Upon engagement of the arresting line 58 by the aircraft line receiver 140, the intermediate line portion 59 is drawn rearward, see Figure 5, to exert laterally inward forces on the line carriers 35 and effect inward swinging movement of the latter to the phantom position there illustrated. In this position, the intermediate line portion 59 is released from its hooked engagement in the line carriers. This inward swinging movement of each line carrier effects momentary closure of its switch 42, which energizes the relays 114 and 111 to close relay switch 113 and close relay switch 110 in line 107. More particularly, closure of switch 42 effects the passage of current through line 117, relay coil 114, line 118, line 116, and relay coil 111. Relay switch 113 is held closed after the opening of switch 42 by holding line 118. Current now passes through line 112, switch 113, line 118, the coil of relay 114, limit switch 70, and line 117 to retain relay 114 closed, while current passes through line 112, switch 113, line 116, and coil 111 to hold relay switch 110 closed in line 107 and open line 108. Current therefore passes through line 109, switch 110, and line 107 to effect reversal of rotation of motor 19. As current also passes through line 112, switch 113, line 115, solenoid 81, and line 76, to shift the clutch 21 into engagement with the motor, the outriggers 11 are lowered into engagement with the switches 70. The latter switches are thereby opened causing the relays 114 and 111 to drop out, thereby disengaging the clutch 21 and returning the relay switches to their original, illustrated condition.

When the line 58 is removed from the outriggers by an incoming aircraft, the windlasses 65 may be turned against the resistance of brake 64 to rapidly arrest the forward motion of the aircraft. Engagement of the arresting line 58 in the line receiver 140 causes depression of the trip member 152 rearward, thereby opening the line 171 and releasing the latch member 147 of solenoid 145 for downward closing movement. The line is thus automatically retained in the line receiver. When the aircraft has been arrested, the pilot may depress switch 176, see Figure 3, which simultaneously energizes solenoid 145 to retract the latch member 147 out of the opening 144 and effects operation of the motor 167 in the direction causing forward shifting movement of the ejector 150, as described hereinbefore, to eject the cable from the line receiver. Actuation of the switch 176 effects operation of the motor 166 in a direction causing retraction of the ejector 150, until the limit switch 164 is opened. The line-receiver mechanism is thereby returned to its original, illustrated condition.

After the arresting line 58 has been ejected from the line receiver 140, the switch 133, see Figure 7, is manually closed. As the limit switch 134 is closed when the arresting line is extended, current passes through the switch 133, line 132, relay 131, line 137, and through switch 134 to close switches 130 and 136 of the relay 131. Current passing through line 135 and switch 136 serves to hold the relay 131 closed. Current also passes through the switch 130, line 129, and solenoid 128 to shift the solenoid core 127 against the force of spring 126, to thereby release brake 64 and engage the windlass clutch 63 with the motor 62. The windlasses then retrieve the line 58 until the balls 68 engage with the arms 67 to open the switches 134. Thereupon, current fails in the relay coil 131 and opens relay switches 136 and 130 to de-energize solenoid 128 and return the clutch 63 and brake 64 to their illustrated position of Figure 7. The line 58 may now be re-engaged over the line carriers 35 in preparation for the next incoming aircraft.

While the schematic diagram of Figure 7 illustrates the outrigger and arresting-line controls on only one side of the runway, it is of course appreciated that such apparatus may be duplicated on both sides of the runway.

From the foregoing, it is seen that the present invention provides an aircraft-arresting device which fully accomplishes its intended objects, and is well adapted to meet practical conditions of manufacture, installation, and use.

Although the present invention has been described in some detail by way of illustration and example for purposes of clarity of understanding, it is understood that certain changes and modifications may be made within the spirit of the invention and scope of the appended claims.

What is claimed is:

1. An aircraft arrester for a landing runway, said arrester comprising a pair of outriggers adapted to be mounted on opposite sides of said runway for up and down movement, drive means for effecting up and down movement of said outriggers, means for sensing the presence of an aircraft to be arrested and operatively connected to said drive means for elevating said outriggers, a line having an intermediate portion extending between and removably engaged on said outriggers for up and down movement therewith, said line thus being movable with said outriggers for engagement with an aircraft landing on said runway for removal from said outriggers by said aircraft, windlass means connected to opposite ends of said line for paying out and retrieving the latter, releasable brake means associated with said windlass means for retarding pay-out of said line, drive means disengageably connected to said windlass means for retracting said line, and actuating means on said outrigger operatively connected to said outrigger drive means for lowering said outriggers upon removal of said line from said outriggers.

2. An aircraft arrester according to claim 1, in combination with means on said outriggers for detecting the belly height of a landing aircraft and operatively connected to said outrigger drive means for terminating upward outrigger movement in position for engagement of said line with said aircraft.

3. An aircraft arresting system comprising a pair of outriggers adapted to be arranged on opposite sides of an aircraft landing runway and mounted for up and down movement, drive means for effecting up and down movement of said outriggers, means for sensing the presence of an aircraft to be arrested and operatively connected to said drive means for elevating said outriggers, a line having an intermediate portion extending between and removably engaged on said outriggers for up and down movement therewith, a forwardly opening receiver adapted to be carried by said aircraft for receiving said elevated intermediate line portion, latch means mounted for movement into and out of closing relation with respect to said receiver to retain and release the received line, and trip means located in said receiver in position to be engaged by a received line and operatively connected to said latch means to move the latter into its closing relation upon engagement by said line, and means connected to opposite ends of said line to yieldably pay out said line upon engagement thereby of said receiver to arrest motion of said aircraft.

4. An aircraft arresting system according to claim 3, in combination with means for moving said latch out of its receiver closing relation, means for ejecting said line from said receiver, and operating means for actuating said latch moving means and said line ejecting means to remove said line from said receiver.

5. An aircraft arresting cable receiver comprising a generally hooked-shaped body adapted to be carried by an aircraft in forwardly opening relation with respect to the latter, a latch mounted in said body for shifting movement into and out of closing relation with said hooked-shaped body, an ejector mounted in the bight portion of said hooked-shaped body for forward extension into and retraction out of the open region of said hooked-shaped body, a line engager extending forward from said ejector into the open body region and mounted in said ejector for movement therewith and for resiliently yieldable rearward depression relative to the latter upon engagement with an arresting line received in said body, means operatively connecting said line engager to said latch to shift the latter into said closing relation upon depression of said line engager by a received line, and motive means operatively connected to said latch and ejector for shifting the former out of its closing relation and extending said ejector and line engager to remove a line from said body.

6. An aircraft arresting cable receiver according to claim 5, said latch shifting means comprising a solenoid arranged in driving relation with said latch.

7. An aircraft arrester for landing runway, said arrester comprising a pair of generally parallel arms arranged longitudinally of and on opposite sides of said landing runway and having their forward ends pivotally mounted for swinging up and down movement of their rearward ends, a pair of rearwardly opening hooks pivotally mounted on the rearward regions of said arms and resiliently yieldably swingable toward each other, and a flexible arresting line having its opposite ends adapted to be yieldably anchored forward of said hook and having its intermediate portion engaged in and extending between said hooks, whereby rearward distension of a central region of said line by engagement of the latter with an aircraft serves to swing said hooks toward each other and remove said line from said hooks.

8. An aircraft arrester according to claim 7, in combination with drive means for effecting swinging up and down movement of said arms, and actuating means associated with said hooks and operatively connected to said drive means to effect downward swinging movement of said arms upon inward swinging movement of said hooks.

9. An aircraft arrester for a landing runway, said arrester comprising a pair of outriggers adapted to be mounted on opposite sides of said runway for up-and-down movement, drive means for effecting up-and-down movement of said outriggers, means for sensing the presence of an aircraft to be arrested and operatively connected to said drive means for elevating said outriggers, means on said outriggers for detecting the belly height of a landing aircraft and operatively connected to said outrigger drive means to terminate upward outrigger movement in position for engagement of said line with said aircraft, a line having an intermediate portion extending between and removably engaged on said outriggers for up-and-down movement therewith, said line thus being movable with said outriggers for engagement with an aircraft landing on said runway for removal from said outriggers by said aircraft, and means connected to opposite ends of said line to yieldably pay out said line upon engagement thereof by said aircraft to arrest motion of the latter.

10. An aircraft arrester for a landing runway, said arrester comprising a pair of outriggers adapted to be mounted on opposite sides of said runway for up-and-down movement, drive means for effecting up-and-down movement of said outriggers, means for sensing the presence of an aircraft to be arrested and operatively connected to said drive means for elevating said outriggers, with means on said outriggers operatively connected to said outrigger drive means for actuating the latter to lower said outriggers responsive to removal of said line from said outriggers, a line having an intermediate portion extending between and removably engaged on said outriggers for up-and-down movement therewith, said line thus being movable with said outriggers for engagement with an aircraft landing on said runway for removal from said outriggers by said aircraft, and means connected to opposite ends of said line to yieldably pay out said line upon engagement thereof by said aircraft to arrest motion of the latter.

References Cited in the file of this patent

UNITED STATES PATENTS

| | | |
|---|---|---|
| 1,789,653 | Hoyt | Jan. 20, 1931 |
| 2,276,312 | Jurschick | Mar. 17, 1942 |
| 2,486,397 | Feilbach | Nov. 1, 1949 |
| 2,777,653 | Cotton et al. | June 15, 1957 |
| 2,783,957 | O'Neil et al. | Mar. 5, 1957 |